United States Patent Office 3,258,692
Patented June 28, 1966

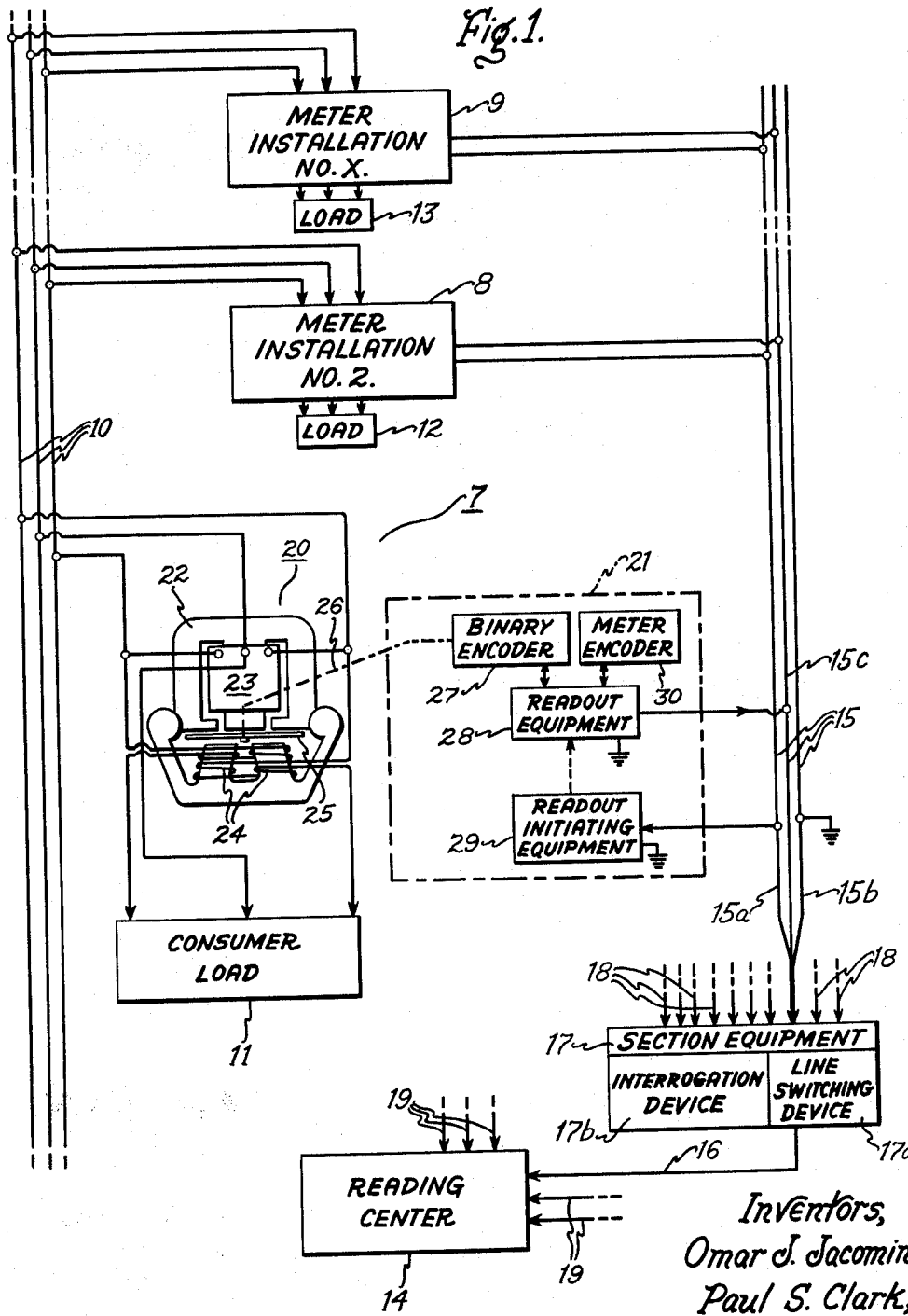

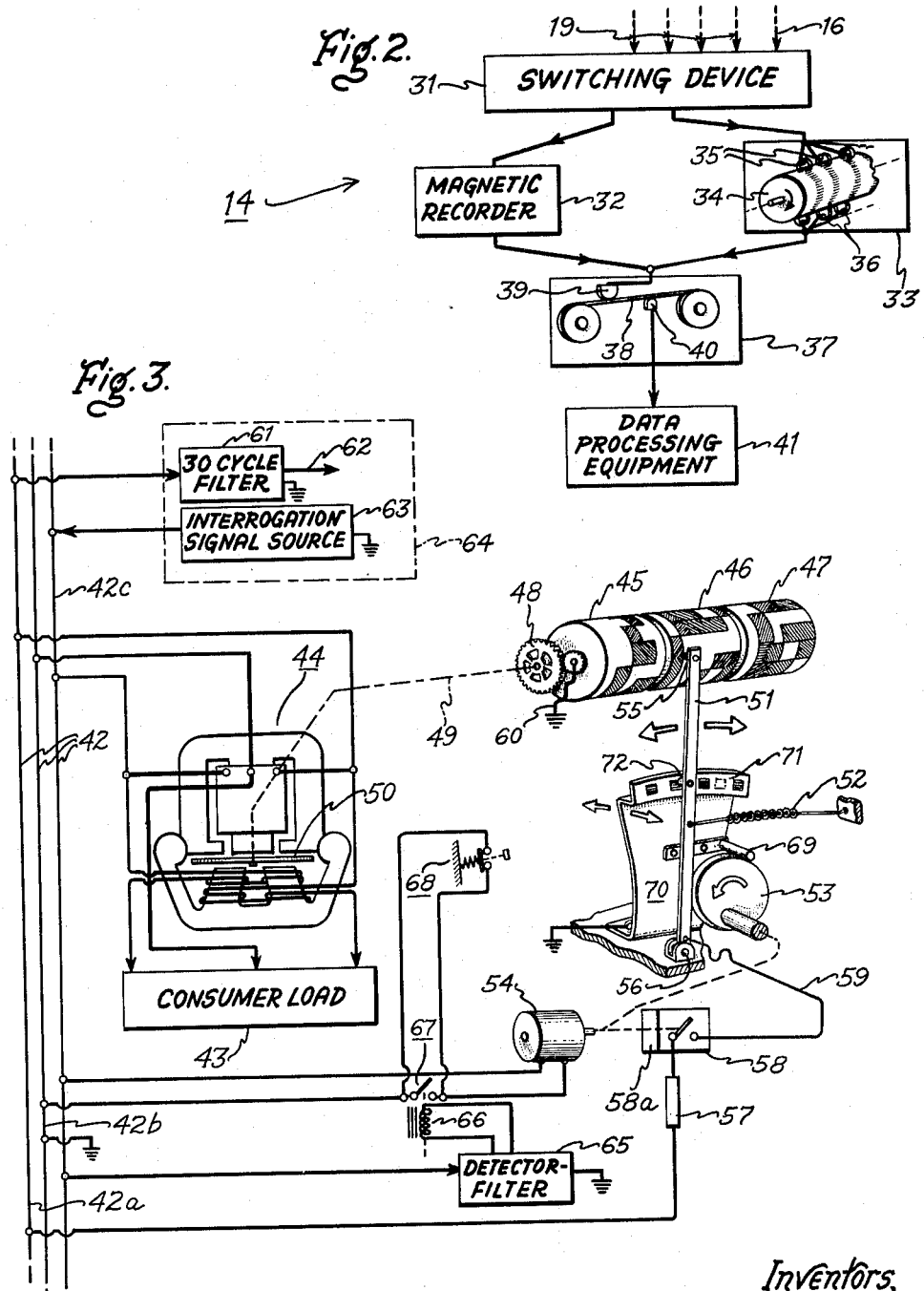

3,258,692
AUTOMATIC READING APPARATUS FOR PLURAL METERS BY TRANSMITTED CODED PULSE TRAINS
Omar J. Jacomini, Severna Park, Md., and Paul S. Clark, Santa Ana, Calif., assignors to General Electric Company, a corporation of New York
Filed Dec. 8, 1960, Ser. No. 74,727
1 Claim. (Cl. 324—113)

The present invention relates to improvements in metering, and, in one particular aspect, to unique automatic encoding and processing of measurements developed by household utility meters.

As is well known, reading of utility meters such as the common household electric watthour meter is customarily performed at regular but infrequent intervals by visiting meter readers who observe and report the visible registrations of the supply at each consumer site. Differences between successive readings obtained through this cumbersome and laborious practice then provide the basis for calculation of the billing for each consumer. Labor costs incident to the reading and the human processing of this data are burdens which the producer and consumer have been obliged to accept in the absence of reliable and economical alternatives. Moreover, it commonly occurs that different increments of the production and consumption are of significantly different values, the variations occurring within extremely short intervals as compared with the usual monthly intervals between meter readings, such that those who consume under prevailing conditions most favorable to the supplier are not identifiable and must nevertheless bear a disproportionately large share of the total cost under a uniform step rate structure. By way of explanation of such short-term differences in economic value of the supply, it is noted that in the electric power industry generating and distributing equipments function most efficiently under prescribed conditions of loading and it therefore becomes economic inducement to both the utility and consumer that the consumption be increased when it falls below such loading and that it be curtailed, or at least assessed against the excessive consumers at rates equitably offsetting the increased cost of supply, when the optimum loading is exceeded. The latter objective has been approached to some extent through use of demand meters, such as those which register maximum kilowatthour demand by the consumer during the interval between readings, the restrictions to or excesses over prescribed limits providing the basis for appropriately lower and higher charges. For similar reasons, it has now also become a common practice for utilities to activate high-wattage household electric water heaters automatically, such that their loads will be absorbed during those periods which are known to involve otherwise light system loading. In any event, the costs, labors and errors of human readers are not eliminated, and the simple totalized meter registrations fail to evidence the consumer's demands within short periods when significant variations are likely to occur. The latter type of information is important not only for the billing purposes mentioned but also for the utility's purposes in following and accommodating widely-varying instanteous demand in the most effective and economical manner.

The present teachings involve distinct departure from the known prior techniques of integrating and reporting metered data, each of the meters in a grouped subdivision of all meters serving a consumer area being uniquely constructed to report its integrations to a remote center in distinctive binary electrical form responsive to initiating signal which can be generated either at the remote center or at the meter sites themselves. Encoding mechanisms which form part of the meters and which may replace the conventional visual register mechanisms produce highly accurate characterizations of the metered data, on either a long-term basis corresponding to the usual monthly reading period or on a short-term basis such as a fifteen-minute reading period, the latter closely following and characterizing consumer demand. Need for human meter readers is entirely obviated, and the data in binary form is readily processed automatically by digital computation equipment. The existing electrical utility service lines themselves provide a communication link for the automatic metering, in a preferred system arrangement.

Accordingly, it is an object of the present invention to provide novel and improved automatic metering involving the reporting of binary-coded electrical signals which distinctively identify the supplies to each of a number of consumer loads.

Another object is to provide an improved automatic reading and billing system for an electrical power network in which each of the meters at a plurality of consumer sites reports its integrations in terms of binary-coded electrical pulses and in which the coded reports are communicated to a remote location for automatic storage and data processing, the system being adapted to manufacture, installation and operation at relatively low cost.

A further object is to provide novel and improved electrical watthour metering equipment for automatic reading and billing systems in which the mechanical output movements of an induction watthour meter motor unit are periodically translated into distinctive coded electrical pulse form by a unique low-torque high-precision encoder, the capabilities for reporting data being sufficient to characterize short-term demand.

By way of a summary account of practice of this invention in one of its aspects, each of a group of electrical watthour meter installations at neighboring consumer locations includes a unique pulse coding stage which is coupled with a remote reading center by a communications link which is preferably formed by lines of the electric service mains. A power-responsive stage at each meter installation comprises a conventional electric induction watthour meter motor unit which rotates a pivoted conductive disk at an angular velocity proportional to the electrical power being drawn by the associated consumer load from the service mains. The rotatable disk of the power stage is mechanically coupled with the coding stage where it angularly orients a rotatable encoder having a coding pattern marked upon it for scanning operations which accurately disclose its angular orientations and, hence, the power consumptions by the load. Within the coding stage, the scanning of the encoder is performed along a predetermined path fixed in relation to the rotatable encoder, to produce an output of electrical pulses having a binary coding which characterizes the integration performed by the meter motor unit. The scanning is preferably responsive to a timed interrogation signal transmitted to the meter installation from a computation center along the service lines at a distinctive low frequency different from the 60 cycle supply frequency, and the coded signals generated at the meter installation are preferably modulated upon another distinctive low frequency transmitted back to the computation center along the service lines. The coded signals are preferably modulated upon a carrier of frequency lower than the 60 cycle supply frequency and generated locally at the meter installation by a timed switching of the supply. Successive interrogation signals from the computation center are applied at frequent intervals, such as fifteen minute intervals, and the binary coded responses are automatically stored by magnetic recording, identified with the responding meter installations either in accordance with a predetermined sequence of the responses or in accordance with further distinctive binary codings of the meter installations. Recorded meter readings indicate the power consumptions by the loads and provide the basis for automatic billing computations by the computer equipment as well as information related to consumer demands.

Although the aspects of this invention which are believed to be novel are set forth in the appended claims, the details of preferred embodiments and practices of the invention, and the further objects and advantages thereof, may be most readily comprehended through reference to the following description taken in connection with the accompanying drawings, wherein:

FIGURE 1 portrays automatic reading and computation equipment for an electric power distribution system in which the present invention is practiced, the illustrations being partly in schematic and partly in block form;

FIGURE 2 is a block diagram of storage and computation components of an automatic reading system such as that of FIGURE 1; and FIGURE 3 depicts a preferred form of electric meter installation which develops coded meter readings and is in communication with remote storage and computation equipment by way of the electric service lines, the illustrations being in part in schematic, pictorial and block forms.

The apparatus illustrated in FIGURE 1 is designed for use with a number of electrical distribution sections each including a large group of consumer electric meter installations, of which those identified by reference characters 7, 8 and 9 represent the first, second and last meter installations in one such section. By way of example, the group may include one hundred meter installations per section, although this number is not a limiting one. Three-wire electric service lines 10 make the customary single phase power available to the respective consumer loads 11, 12 and 13 through these meter installations. While the traditional practice heretofore has been for readers to visit each household location and to record the visible integrated registrations of the power consumed during the interval since the last such visit, this is avoided in the FIGURE 1 apparatus by automatic electric reporting of the measurements at each meter to memory and computation apparatus of known forms in a reading center 14 which is at a remote site such as that of a utility company office where consumer demand and billing information is ordinarily processed. For these purposes, special encoding stages of all the meter installations in each section are coupled with the reading center by communication links 15 and 16, through intermediate section equipment 17. The latter equipment serves a number of sections, such as the ten sections represented by communication links 15 and 18, and may be situated at a location intermediate these sections and the reading center 14 to perform a selective switching operation through its line switching device 17a which permits the single communication link 16 to carry reported data from all these sections to the reading center. In turn, the reading center also serves a large number of such section equipments, which apply their selectively switched outputs to it over other communication links 19, whereby a community of up to 64,000 consumers may readily be served by a system including one reading center, sixty-four section equipments, and ten sections of 100-meter installations feeding each of the section equipments.

The individual meter installations each include a power-responsive stage and encoding stage, identified by reference characters 20, and 21, respectively, in the case of meter installation 7. Conveniently, the power-responsive stage 20 comprises an induction watthour meter motor unit having a conventional magnetic structure 22, potential and current windings 23 and 24, and a pivoted conductive disk 25 rotated at an angular velocity proportional to the electric power being drawn by the load such that its angular travel represents an integration of the power consumed. While the customary register mechanisms may also be connected with the disk, for visual checking of its integrations or in those instances where existing types of meters are converted for practice of the present teachings, this is not essential and preferably the disk is simply coupled with the electrical encoding stage by way of a drive shaft connection 26. Within the encoder stage 21, a binary encoder device 27 is angularly adjusted by the disk movements, either directly or through appropriate gearing, to establish a coding pattern which within certain limits is unique for angular orientations thereof. As is detailed later herein, the binary encoder device 27 preferably comprises a code disk or code wheel or wheels with permanent code patterns thereon, and the patterns and the rate of rotation of the encoder device in relation to the rate at which the load consumers power are so proportioned that the coding at every instant indicates this power consumption preferably in terms of kilowatthours of usage, since this is the usual billing unit used by utilities. However the code disk or code wheel can be proportioned to within about 200 watthours of the exact value, if desired. This figure of about 200 watthours represents about the minimum acceptable resolution in measurement of electric power consumption. At intervals of about 15 minutes, the encoder device is read out, or scanned, by readout equipment 28 to develop an output in the form of an electrical pulse train in which the presence or absence of pulses in successive periods during the reading operation constitute binary coding "bits." The pattern of pulses in the train characterizes the angular orientation of the encoder device at the time of reading, and hence, the integration of power made up to that time. Readout equipment 28 may be of a mechanical or optical scanning type, as is explained hereinafter, and performs readings responsive to control exercised by readout initiating equipment 29. The latter equipment may include a simple time switch which periodically initiates the readout, but preferably it includes a detector which responds to a distinctive interrogation signal, such as a signal of predetermined frequency, and actuates a solenoid or equivalent torque motor which powers the readout equipment. The interrogation signal is conveniently developed by an interrogation device 17b constituting part of the section equipment 17 and operating in synchronism with the line switching device 17a to apply its electrical signal output to the encoding stage between lines 15a and 15b of the wired communication link 15. For purposes of distinguishing the coded reports from the meter installations in each section, a further binary encoder 30 is added, this also being read by readout equipment, preferably just in advance of its reading of the meter reading encoder 27. Encoder 30 produces a fixed code, rather than one which varies with the meter reading, and this meter code is also in the form of a pulse train. The minimum number of bits in this meter code, each signified by the presence or absence of pulses during predetermined portions of the readout operation, is determined by the number of meter installations to be distinguished from one another in each section, it being known that each bit of information added to a message doubles the number of possible selections and that the progression is one which increases by the power of two. Accordingly, a seven binary bit code, in which the presence or absence of seven sequential pulses in the meter code pulse train represent the seven bits, permits up to 128-meter installations to be identified. Alternatively, where the readout initiating equipment includes a timer, or where the various signalling stages are connected in a chain to respond sequentially to one protracted interrogation signal, the meter encoder 30 may be eliminated. In any event, the binary-coded output pulses from the meter encoding stage is applied to the section equipment 17, and thence to the reading center 14, over the communication link 15, by way of its lines 15c and 15b. The construction of each of the meter installations is of course similar to that of the others in the system.

Line switching device 17a may comprise a conventional form of stepping switch for making the needed connections with the ten section communication links, in sequence. The reading-out of each meter installation encoding device may be accomplished within one-half second, the total readout time for all the 100 encoding devices in one section then being 50 seconds. Ten such sections then involve a readout time of 500 seconds. In the system operating on the basis of a 15-minute interval between successive readings of each encoding device, this total section readout time leaves over six minutes for the switching from one section communication link to another and for the successive readouts of the encoding devices to take place.

The reading center 14 also involves a switching device 31, as shown in FIGURE 2, which serves to connect the 64 output lines 16 and 19 from the section equipments to two like magnetic recorders, 32 and 33, during alternate 15-minute intervals. This switching device may also be of a conventional form, and the two recorders 32 and 33 are likewise conventional forms of memory devices. The recorders are each preferably of a known construction including a magnetic drum 34, sixty-four recording heads 35 and sixty-four play-back heads 36. In this recording, all of the section equipment outputs are memorized simultaneously. Alternatively, the recorders may comprise magnetic disk or tape units, of course. The recorders alternately play back their memorized binary-coded pulse data to a demand recorder 37, preferably in the form of a magnetic tape 38 associated with the recording head 39 and a reproducing head 40 which delivers the data accumulated over a long period to digital data processing equipment 41. Each of the magnetic recorders 32 and 33 stores the coded meter data for a 15-minute period while the other is rotated at a speed at least 64 times the prior recording speed and while the 64 reproducing heads are sequentially connected to deliver their read-out signals to demand recorder 37 in a predetermined sequence. This sequential readout may be controlled by conventional switching, not illustrated. At the end of each 15-minute period, the demand tape 38 has memorized demand readings, recorded in binary number form, for all the meter installations in a predetermined sequence from the first to the last of the sixty-four thousand. A computer tape is then prepared from these readings as they are reproduced by play-back head 40 and delivered to the data processing equipment 41 where a billing rate factor is entered to reflect the different charges for different hours of the day, or the like.

The meter installation depicted in FIG. 3 is one which communicates with remote section equipment and reading center by way of the electric service lines 42 supplying the consumer load 43 through the meter motor unit 44. Encoding of the meter integrations is there performed by a series of code wheels or drums 45, 46 and 47 which are driven through appropriate gearing, such as that designated by reference character 48, by the mechanical coupling 49 from rotatable conductive disk 50 of meter motor unit 44. The three drums are each coded with a pattern which, when scanned by a movable readout brush arm 51, will indicate its angular orientation within one-tenth of a revolution, and the drive gearing is such that the first drum 45 is rotated at least one-tenth of a revolution for each 200 watt-hours of power consumption by load 43. In turn, the drum 46 rotates once for each ten revolutions of drum 45, and the drum 47 rotates once for each ten revolutions of drum 46. Where one-tenth revolution of drum 45 characterizes the consumption of 100 watthours, then the instantaneous angular orientations of drums 47, 46 and 45 characterize tens, units, and tenths of kilowatts respectively so that up to ninety-nine and nine-tenths kilowatt hour of power may be integrated between successive readouts without loss of metering information. The coding pattern one-half of which is shown on drum 45 and the following half of which is shown on drum 46, is one which identifies ten digits from zero to nine and which produces only an odd number of pulses when scanned axially. This odd-number parity check permits detection of errors in that any combination involving an even number of pulses signifies a mistake. An even-number parity check may be used, alternatively, for the same purpose. Longitudinal scanning of the coded drums for readout purposes is accomplished by movement of the brush arm 51 as its spring 52 urges it to follow the motions of cam 53 driven by a synchronous 60-cycle electric motor 54. Brush arm 51 carries a small conductive wiper or brush 55 which sequentially engages and wipes longitudinally across the coded drum surfaces during clockwise sweep of brush arm about its pivot 56, and this brush or wiper makes electrical connection only with the grounded coded surfaces represented in black on the illustration, the balance of the surfaces being electrically insulating. An electrical pulse is developed each time a grounded coded drum surface is wiped by the brush, as the result of current flow from one of the service lines, 42a through impedance 57, 30-cycle circuit-interrupting switch 58, line 59, brush arm 51, and a conductive drum surface grounded at 60 to the potential of service line 42b. Interrupting switch 58 is actuated at a 30-cycle switching rate by synchronous motor 54, through an appropriate gear box section 58a, and the 60-cycle supply flowing through it is therefore modulated to have a distinct 30-cycle component of durations the same as the durations of contact between brush 55 and coded conductive surfaces of the encoding drums. Impedance 57, which may be inductive and/or resistive, insures that this modulation significantly affects the electrical characteristics of the circuitry between service lines 42a and 42b and that the 30-cycle coded pulses are therefore communicated to a remote 30-cycle filter 61 from whence they are applied to data storage and handling equipment at a reading center over line 62. Relatively low frequencies other than 30-cycle frequencies may be selected, of course, provided they are also readily distinguishable from the 60 cycles of the supply and will be transmitted over its lines without undue loss and interference from common noise sources.

Readout is initiated by a brief interrogation signal applied between service lines 42c and 42b by a source 63 at a remote location such as that of section equipment 64. This signal output is of a distinctive frequency for each meter installation being interrogated and is also of a relatively low frequency which can be readily transmitted along the service lines. Detector-filter 65 responds to the distinctive signal by producing an output energizing relay coil 66 and temporarily closing the normally-open relay switch 67 which then starts synchronous motor 54. This motor and its cam 53 cause brush arm to move clockwise and to scan the coded drums in the manner described hereinbefore, at the same time permitting normally-closed holding switch 68 to close and maintain the motor running even though the interrogation signal ceases. Once the brush arm has scanned the drums and begins to follow the cam 53 with a counterclockwise movement, the cam rider 69 of a flexible code strip member 70 permits the member 70 to flex forward to a position where its code strip surfaces 71 bear against a second wiper 72 on the brush arm 51, thereby entirely disengaging wiper 55 from the drums. Therefore, on counterclockwise movement toward the starting position, brush arm 51 cannot generate any output related to the readings of the drums and, instead, generates a pulse code identifying the specific meter installation which is making a report. The latter code, also in terms of 30-cycle pulsations, depends upon the presence or absence of grounded conducting surfaces at predetermined positions along the code strip. Conducting surfaces on the illustrated code strip are also shown in black. The number of such bits of meter coding information is determined according to the number of meter installations which are to be distinguished from one another, in line with coding techniques referred to earlier herein. Upon return of the brush arm to its starting position, it bears against and opens the holding switch 68, ceasing the operation of drive motor 54, and at that time the cam 53 is in position to flex code strip member 70 rearwardly away from the flexible brush arm, permitting the latter to assume a position in which it can again wipe the drum surfaces during the first half of the succeeding cycle of a scanning operation.

It should be understood that the embodiments of this invention disclosed herein are intended to be of a descriptive rather than a limiting character and that various changes, combinations, substitutions or modifications may be practiced in accordance with these teachings without departing either in spirit or scope from this invention in its broader aspects.

What we claim as new and desire to secure by Letters Patent of the United States is:

Automatic metering apparatus comprising a plurality of metering sections each including a plurality of meter installations including an electric induction watthour meter motor having a disk rotated at an angular velocity proportional to the instantaneous energy supplied to a consumer electrical load from electrical service mains through said meter motor, rotatable encoder means having a binary coding pattern thereon distinctively identifying predetermined angular increments of the angular orientations of said encoder means in relation to a stationary scanning path extending across the path of angular movements of said pattern, means mechanically coupling said disk in driving relationship to said rotatable encoder means, whereby said binary pattern exhibited along said scanning path at any time characterizes the integrations of the energy supplied to the load within a predetermined incremental value thereof, and readout means responsive to electrical initiation signals applied thereto for progressively scanning said encoder means along said scanning path and producing a train of electrical pulses coded in accordance with the angular orientations of said encoder means; means producing electrical initiation signals and periodically applying said signals to said readout means of said meter installations in each of said sections in sequence; means remote from said sections for recording the trains of coded electrical pulses in binary form; and electrical communication means applying to said remote recording means in sequence the trains of coded electrical pulses produced by the meter installations in each of said sections in sequence, said meter installations further including a synchronous electric timing motor, switching means having electrical contacts opened and closed by said timing motor at a relatively low rate close to and distinguishably different from the frequency of energy supplied by said service mains, impedance means, and means applying energy of said frequency from said service mains to said readout means through said impedance and through said switching contacts, said readout means including means for modulating the said energy applied thereto in accordance with the coding of said pattern to produce said coded pulse train; and wherein said electrical communication means includes said electrical service mains, and means detecting the coded pulse train modulation of energy in said service mains which is further modulated at said relatively low rate by said switching means.

References Cited by the Examiner

UNITED STATES PATENTS

| | | |
|---|---|---|
| 1,802,643 | 4/1931 | Floyd. |
| 1,902,465 | 3/1933 | Pratt _____ 346—34 |
| 1,933,996 | 11/1933 | Paris _____ 346—34 |
| 2,067,098 | 1/1937 | Rogers. |
| 2,335,755 | 11/1943 | Haddad _____ 340—182 |
| 2,719,284 | 9/1955 | Roberts et al. _____ 340—151 |
| 2,907,020 | 9/1959 | Champion _____ 340—347.3 |
| 2,942,243 | 6/1960 | Bilz _____ 340—182 |
| 2,970,307 | 1/1961 | Bentley _____ 340—347.3 |
| 3,095,559 | 6/1963 | Wolinsky _____ 340—347 |

WALTER L. CARLSON, *Primary Examiner.*

ELI J. SAX, FREDERICK M. STRADER, *Examiners.*

R. V. ROLINEC, D. R. GREENE, C. F. DUFFIELD,
*Assistant Examiners.*